United States Patent
Gagne-Keats

(10) Patent No.: US 10,158,164 B2
(45) Date of Patent: Dec. 18, 2018

(54) HANDHELD MOBILE DEVICE WITH HIDDEN ANTENNA FORMED OF METAL INJECTION MOLDED SUBSTRATE

(71) Applicant: Essential Products, Inc., Palo Alto, CA (US)

(72) Inventor: Jason Sean Gagne-Keats, Cupertino, CA (US)

(73) Assignee: ESSENTIAL PRODUCTS, INC., Palo Alto, CA (US)

(*) Notice: Subject to any disclaimer, the term of this patent is extended or adjusted under 35 U.S.C. 154(b) by 0 days.

(21) Appl. No.: 15/697,373

(22) Filed: Sep. 6, 2017

(65) Prior Publication Data

US 2017/0373377 A1  Dec. 28, 2017

Related U.S. Application Data

(63) Continuation-in-part of application No. 15/336,701, filed on Oct. 27, 2016, now Pat. No. 9,896,777.
(Continued)

(51) Int. Cl.
*H01Q 1/24* (2006.01)
*B32B 7/12* (2006.01)
(Continued)

(52) U.S. Cl.
CPC ............ *H01Q 1/243* (2013.01); *B32B 7/12* (2013.01); *B32B 15/00* (2013.01); *C23C 22/00* (2013.01); *C25D 11/026* (2013.01); *C25D 11/16* (2013.01); *C25D 11/26* (2013.01); *C25D 11/30* (2013.01); *C25F 3/08* (2013.01); *B23H 3/00* (2013.01);
(Continued)

(58) Field of Classification Search
CPC .......................... H01C 1/243; H01C 1/2283
See application file for complete search history.

(56) References Cited

U.S. PATENT DOCUMENTS

| | | |
|---|---|---|
| 5,118,567 A | 6/1992 | Komiyama et al. |
| 5,456,779 A | 10/1995 | Sinha et al. |

(Continued)

FOREIGN PATENT DOCUMENTS

| | | |
|---|---|---|
| CN | 1788385 B | 6/2011 |
| TW | 200620543 A | 6/2006 |

(Continued)

OTHER PUBLICATIONS

International Search Report PCT/US16/59512 dated Mar. 17, 2017, 9 pages.
(Continued)

*Primary Examiner* — Hoang Nguyen
*Assistant Examiner* — Awat Salih
(74) *Attorney, Agent, or Firm* — Perkins Coie LLP

(57) ABSTRACT

The disclosed embodiments include a housing of a handheld mobile device. The housing includes a ceramic layer forming a continuous outermost surface of the handheld mobile device, and an antenna layer adjacent to the ceramic layer. The antenna layer including conductive elements formed from a metal injection molded substrate, and an antenna break formed of non-conductive material electrically separating the conductive elements to collectively form an antenna of the handheld mobile device that is hidden by the ceramic layer from an exterior view of the handheld mobile device.

19 Claims, 7 Drawing Sheets

Related U.S. Application Data

(60) Provisional application No. 62/336,513, filed on May 13, 2016, provisional application No. 62/317,466, filed on Apr. 1, 2016, provisional application No. 62/300,631, filed on Feb. 26, 2016, provisional application No. 62/249,130, filed on Oct. 30, 2015, provisional application No. 62/528,357, filed on Jul. 3, 2017.

(51) Int. Cl.

| | | |
|---|---|---|
| *B32B 15/00* | (2006.01) | |
| *C25D 11/02* | (2006.01) | |
| *C25D 11/26* | (2006.01) | |
| *C25F 3/08* | (2006.01) | |
| *C23C 22/00* | (2006.01) | |
| *C25D 11/16* | (2006.01) | |
| *C25D 11/30* | (2006.01) | |
| *H01Q 1/22* | (2006.01) | |
| *B23H 3/00* | (2006.01) | |
| *B23H 5/06* | (2006.01) | |
| *B23H 9/00* | (2006.01) | |

(52) U.S. Cl.
CPC .................. *B23H 5/06* (2013.01); *B23H 9/00* (2013.01); *B32B 2255/24* (2013.01); *B32B 2315/02* (2013.01); *B32B 2457/00* (2013.01); *H01Q 1/2283* (2013.01)

(56) References Cited

U.S. PATENT DOCUMENTS

| | | | |
|---|---|---|---|
| 7,078,613 | B2 | 7/2006 | Spivack et al. |
| 7,921,553 | B2 | 4/2011 | Wojack et al. |
| 8,656,579 | B2 | 2/2014 | Wojack et al. |
| 9,565,777 | B1 | 2/2017 | Arvin et al. |
| 2005/0032558 | A1 | 2/2005 | Chen |
| 2005/0101356 | A1 | 5/2005 | Hutchison |
| 2006/0001130 | A1 | 1/2006 | Islam et al. |
| 2007/0020926 | A1 | 1/2007 | Kalvesten et al. |
| 2010/0053002 | A1 | 3/2010 | Wojack et al. |
| 2011/0316753 | A1* | 12/2011 | Wu .................... H01Q 1/243 343/702 |
| 2012/0176278 | A1 | 7/2012 | Merz et al. |
| 2012/0194393 | A1* | 8/2012 | Uttermann ............. H01Q 1/243 343/702 |
| 2012/0206302 | A1* | 8/2012 | Ramachandran ........ H01Q 1/24 343/702 |
| 2013/0076573 | A1* | 3/2013 | Rappoport ............. H01Q 1/243 343/702 |
| 2013/0222195 | A1 | 8/2013 | Hill et al. |
| 2013/0234899 | A1* | 9/2013 | Pope ....................... H01Q 1/243 343/702 |
| 2013/0302103 | A1 | 11/2013 | Sona et al. |
| 2013/0335292 | A1* | 12/2013 | Hung ................... H01Q 1/2266 343/866 |
| 2014/0106684 | A1 | 4/2014 | Burns et al. |
| 2014/0125528 | A1* | 5/2014 | Tsai ..................... H01Q 13/106 343/702 |
| 2014/0191910 | A1 | 7/2014 | Chung et al. |
| 2014/0320369 | A1* | 10/2014 | Azenui .................. H01Q 1/526 343/841 |
| 2014/0361945 | A1 | 12/2014 | Misra et al. |
| 2015/0048979 | A1 | 2/2015 | Asrani et al. |
| 2015/0050968 | A1* | 2/2015 | Jeon ......................... C25D 5/48 455/575.1 |
| 2015/0167193 | A1 | 6/2015 | Demers et al. |
| 2015/0284836 | A1* | 10/2015 | Liu .......................... C23C 28/32 428/64.1 |
| 2016/0049720 | A1 | 2/2016 | Hwang et al. |
| 2017/0121840 | A1 | 5/2017 | Evans et al. |
| 2017/0125897 | A1 | 5/2017 | Rubin et al. |

FOREIGN PATENT DOCUMENTS

| | | |
|---|---|---|
| TW | 201301564 A | 1/2013 |
| WO | 2010011009 A1 | 1/2010 |
| WO | 2016190737 A2 | 12/2016 |

OTHER PUBLICATIONS

International Search Report PCT/US16/59519 dated Mar. 31, 2017, 11 pages.
MetalMembranes.com B.V., "Method to produce electrically isolated or insulated areas in a metal, and a product comprising such area", Priority document for application PCT/NL2016/050372, 8 pages.
Non-Final Office Action dated Apr. 21, 2017 in U.S. Appl. No. 15/336,686 of Rubin, A. et al., filed Oct. 27, 2016.
Non-Final Office Action dated Jun. 15, 2017 in U.S. Appl. No. 15/336,701 of Evans, D. et al., filed Oct. 27, 2016.
Notice of Allowance dated Sep. 18, 2017 for U.S. Appl. No. 15/336,686 of Rubin, A. et al., filed Oct. 27, 2016.
Office Action dated Sep. 8, 2017 in Taiwan Patent Application No. 105135167, 11 pages.
Restriction Requirement dated Jan. 31, 2017 for U.S. Appl. No. 15/336,686 of Rubin, A. et al. filed Oct. 27, 2016.
Restriction Requirement dated Mar. 9, 2017 for U.S. Appl. No. 15/336,701 of Evans, D. et al. filed Oct. 27, 2016.
U.S. Appl. No. 15/700,056 of Rubin, A. et al., filed Sep. 8, 2017.
U.S. Appl. No. 15/700,060 of Rubin, A. et al., filed Sep. 8, 2017.
U.S. Appl. No. 15/700,064 of Rubin, A. et al., filed Sep. 8, 2017.
Corrected Notice of Allowability dated Nov. 2, 2017 for U.S. Appl. No. 15/336,701 of Evans et al., filed Oct. 27, 2016.
Notice of Allowance dated Oct. 17, 2017 for U.S. Appl. No. 15/336,701 of Evans et al., filed Oct. 27, 2016.
Office Action and Search Report dated Dec. 11, 2017 for Taiwan Patent Application No. 105135142 of Essential Products, Inc. filed on Oct. 28, 2016.
Corrected Notice of Allowability dated Jan. 22, 2018 for U.S. Appl. No. 15/336,701 of Evans et al.
Notice of Grant dated Jun. 21, 2018 for Taiwan Patent Application No. 105135142 of Essential Products, Inc.

\* cited by examiner

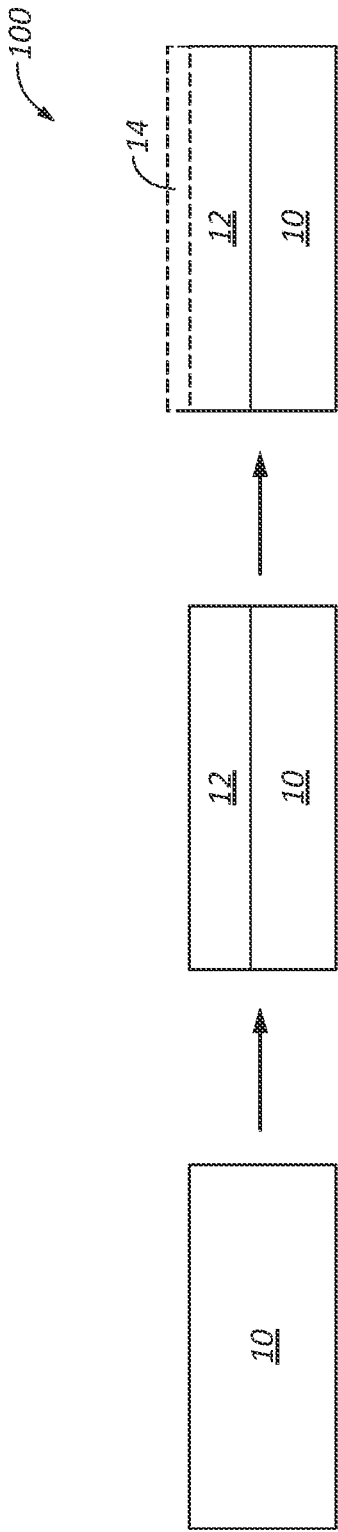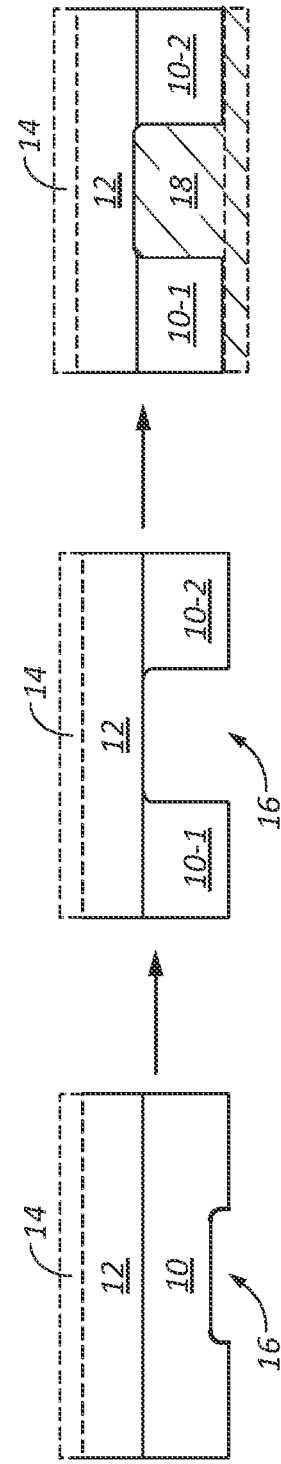

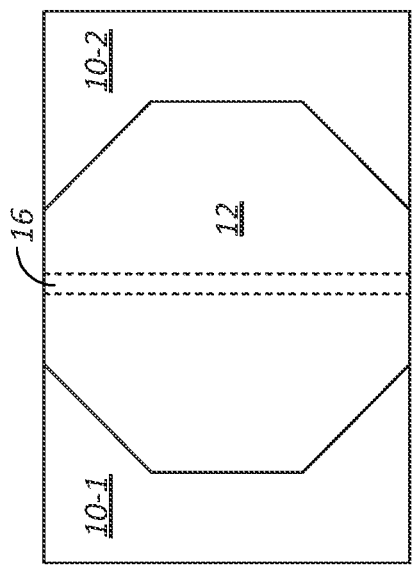
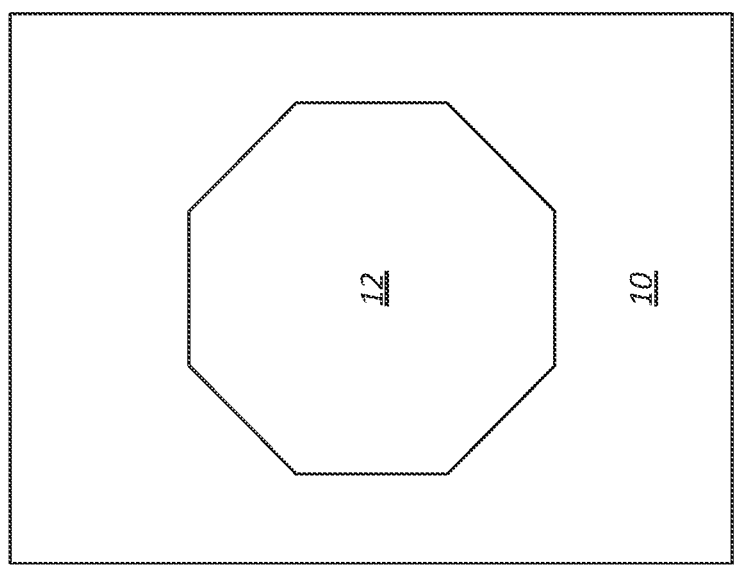

| Plate # | PEO | | | | | Epoxy | | ECM | | | |
|---|---|---|---|---|---|---|---|---|---|---|---|
| | $i$ [A] | $t$ [min] | $E_{max}$ [V] | $t_{tot}$ [min] | $\alpha$ [μm] | Epoxy | $\alpha$+epoxy [μm] | $E$ [V] | $i_{t=0}$ [A] | Gap [mm] | Contact |
| (a) | 1÷20 | 10 | 350 | 10 | 0 | n.a. | n.a. | n.a. | n.a. | n.a. | n.a. |
| (b) | 20÷5 | 33 | 601 | 33 | 156.4 | EP02/EP14 | 160.3 | 46.1 | 10 | 2.0-2.5 | No |
| (c) | 20 | 11 | 601 | 60 | 67.2 | E-30CL | 147.8 | 46.1 | 10 | 2.0-2.5 | No |
| | 5 | 49 | 562 | | | | | | | | |
| (d) | 20 | 6 | 490 | 30 | 33.2 | E-30CL | 58.3 | 46.1 | 10 | 2.5-3.0 | Yes |
| | 10 | 6 | 583 | | | | | | | | |
| | 5 | 18 | 558 | | | | | | | | |
| (e) | 20 | 9 | Fluctuations | 60 | 81 | EP02/EP14 | 100.3 | 46.1 | 10 | 2.0-2.5 | No |
| | 10 | 11 | 584 | | | | | | | | |
| | 5 | 40 | 572 | | | | | | | | |
| (f) | 20 | 5 | 372 | 45 | 81.6 | E-30CL | 118.0 | 46.1 | 10 | 2.0-3.0 | No |
| | 10 | 8 | 587 | | | | | | | | |
| | 5 | 32 | 571 | | | | | | | | |
| (g) | 20 | 6 | Fluctuations | 40 | 78 | EP02/EP14 | 87.3 | 46.1 | 10 | 2.0-2.5 | Yes |
| | 10 | 9 | 587 | | | | | | | | |
| | 5 | 25 | 568 | | | | | | | | |

FIG. 4

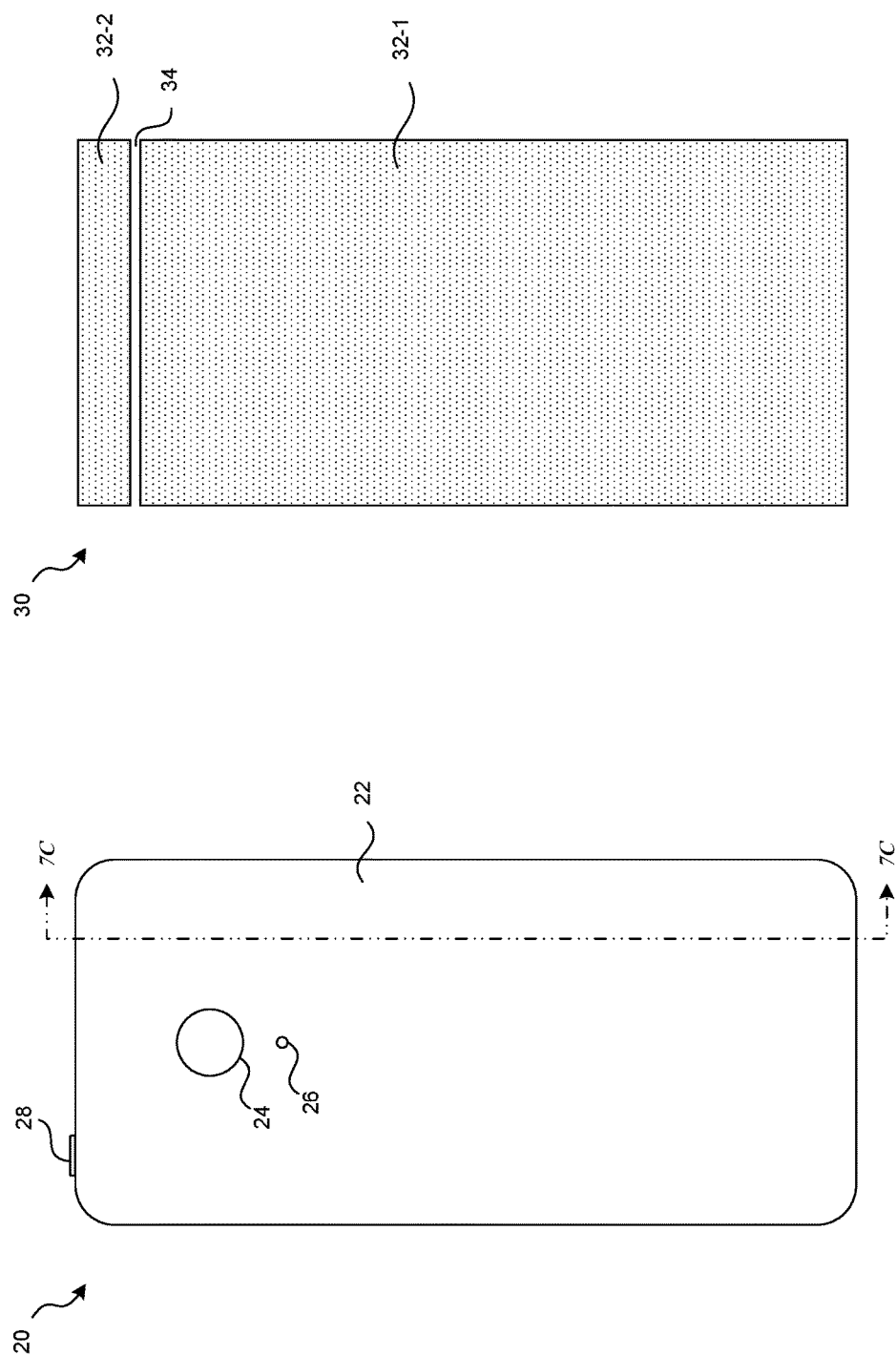

HANDHELD MOBILE DEVICE WITH HIDDEN ANTENNA FORMED OF METAL INJECTION MOLDED SUBSTRATE

CROSS-REFERENCE TO RELATED APPLICATIONS

This application is a continuation-in-part of U.S. patent application Ser. No. 15/336,701 filed Oct. 27, 2016, which claims priority to U.S. provisional patent application Ser. No. 62/336,513 filed May 13, 2016, U.S. provisional patent application Ser. No. 62/317,466 filed Apr. 1, 2016, U.S. provisional patent application Ser. No. 62/249,130 filed Oct. 30, 2015, and U.S. provisional patent application Ser. No. 62/300,631 filed Feb. 26, 2016, which are all incorporated herein in their entireties by this reference. This application also claims priority to U.S. provisional patent application Ser. No. 62/528,357 filed on Jul. 3, 2017, which is also incorporated herein in its entirety by this reference.

TECHNICAL FIELD

The disclosed teachings relate to handheld mobile devices including hidden antennas. More particularly, the disclosed teachings relate to a case forming a housing of a handheld mobile device embedding a hidden antenna formed from a metal injection molded substrate.

BACKGROUND

The design and manufacturing of consumer electronic devices are faced with challenges as consumers continue to demand a greater number of features in handheld mobile devices that have smaller form factors. For example, consumers expect devices such as smartphones and smartwatches to include numerous features without compromising the demand for small sizes or sleek appearances.

The need for antennas in handheld mobile devices is one example. In particular, devices such as smartphones include relatively complex antennas. Modern antenna designs are limited by physical and functional constraints due to the small sizes of handheld mobile devices and the functional restrictions imposed by carriers and regulatory agencies. Moreover, a handheld mobile device typically must accommodate numerous antennas, such as a primary cellular antenna, a diversity cellular antenna, a global positioning system (GPS) antenna, a Wi-Fi antenna, a near field communication (NFC) antenna, and the like. Accordingly, the design and manufacturing of handheld mobile devices including antennas present challenges due to numerous constraints.

SUMMARY

The disclosed embodiments include a housing of a handheld mobile device. The housing includes a ceramic layer forming a continuous outermost surface of the handheld mobile device, and an antenna layer adjacent to the ceramic layer. The antenna layer includes conductive elements formed from a metal injection molded substrate, and an antenna break formed of non-conductive material electrically separating the conductive elements to collectively form an antenna of the handheld mobile device that is hidden by the ceramic layer from an exterior view of the handheld mobile device. The MIM substrate could be composed of titanium, aluminum, magnesium, other conductive materials, or combinations thereof. An example of the handheld mobile device is a smartphone where the antenna is embedded in the case forming the housing of the smartphone.

In some embodiments, the ceramic layer is a metal oxide layer formed from the MIM substrate. In some embodiments, the metal oxide layer is formed by plasma electrolytic oxidation of the MIM substrate.

In some embodiments, the conductive elements are physically separated by a gap in the MIM substrate. In some embodiments, the gap is formed in the MIM substrate in part by an initial mechanical etching process. In some embodiments, the gap is formed to completion in the MIM substrate in part by an electrochemical process after the initial mechanical etching process has completed. In some embodiments, the mechanical etching process is a computer numerical control mechanical machining process. In some embodiments, the gap is the antenna break backfilled with the non-conductive material. In some embodiments, the non-conductive material is an adhesive that bonds the ceramic layer and the conductive elements.

In some embodiments, the housing includes an insulating layer that coats a surface of each conductive elements with a non-conductive material such that the conductive elements are electrically insulated from each other by the antenna break, the ceramic layer, and the insulating layer.

Embodiments include a smartphone device. The smartphone device includes a case forming a housing of the smartphone device. The case includes a continuous outermost surface, and an antenna structure hidden from an exterior view of the handheld mobile device by the continuous outermost surface of the smartphone device. The antenna structure includes conductive elements formed of a MIM titanium substrate, and an antenna break formed of non-conductive material separating the conductive elements to collectively form the antenna of the handheld mobile device.

In some embodiments, the continuous outermost surface is a surface of a metal oxide coating formed by plasma electrolytic oxidation of the MIM substrate.

In some embodiments, the conductive elements are electrically separated by a gap in the MIM substrate formed in part by an initial mechanical etching process and etched to completion by a subsequent electrochemical process. The mechanical etching may be a computer numerical control mechanical machining.

In some embodiments, the gap is the antenna break backfilled with the non-conductive material. In some embodiments, the non-conductive material is an adhesive that bonds the metal oxide coating and the conductive elements.

In some embodiments, the case includes an insulating layer that coats a surface of each conductive element with the non-conductive material such that the conductive elements are electrically insulated from each other by the antenna break, the metal oxide coating, and the insulating layer.

Embodiments also include an antenna structure including conductive elements formed of MIM titanium and separated by a gap filled by non-conductive material. The antenna structure also includes a titanium oxide coating on a first side of the conductive elements, and an insulating coating on a second side of the conductive elements opposite the first side such that the conductive elements are electrically insulated from each other by the gap filled by the non-conductive material, the titanium oxide coating, and the insulating coating.

This Summary is provided to introduce a selection of concepts in a simplified form that are further described below in the Detailed Description. This Summary is not intended to identify key features or essential features of the embodied subject matter, nor is it intended to limit the scope of the embodied subject matter.

BRIEF DESCRIPTION OF THE DRAWINGS

FIGS. 1A through 1F illustrate a process for separating a conductive substrate into electrically insulated conductive elements according to some embodiments of the present disclosure;

FIGS. 2A and 2B are top views of a structure illustrating a process for separating a conductive substrate into electrically insulated conductive elements according to some embodiments of the present disclosure;

FIG. 4 is a table showing parameters involved in different processes for separating a metal substrate into electrically insulated metal elements according to some embodiments of the present disclosure;

FIG. 6A shows antenna elements separated by an antenna break embedded in a case of a handheld mobile device and hidden by a ceramic layer from an exterior view of the handheld mobile device according to some embodiments of the present disclosure;

FIG. 6B is a functional representation of an antenna formed by the case of the handheld mobile device of FIG. 6A according to some embodiments of the present disclosure.

DETAILED DESCRIPTION

Figure 3:
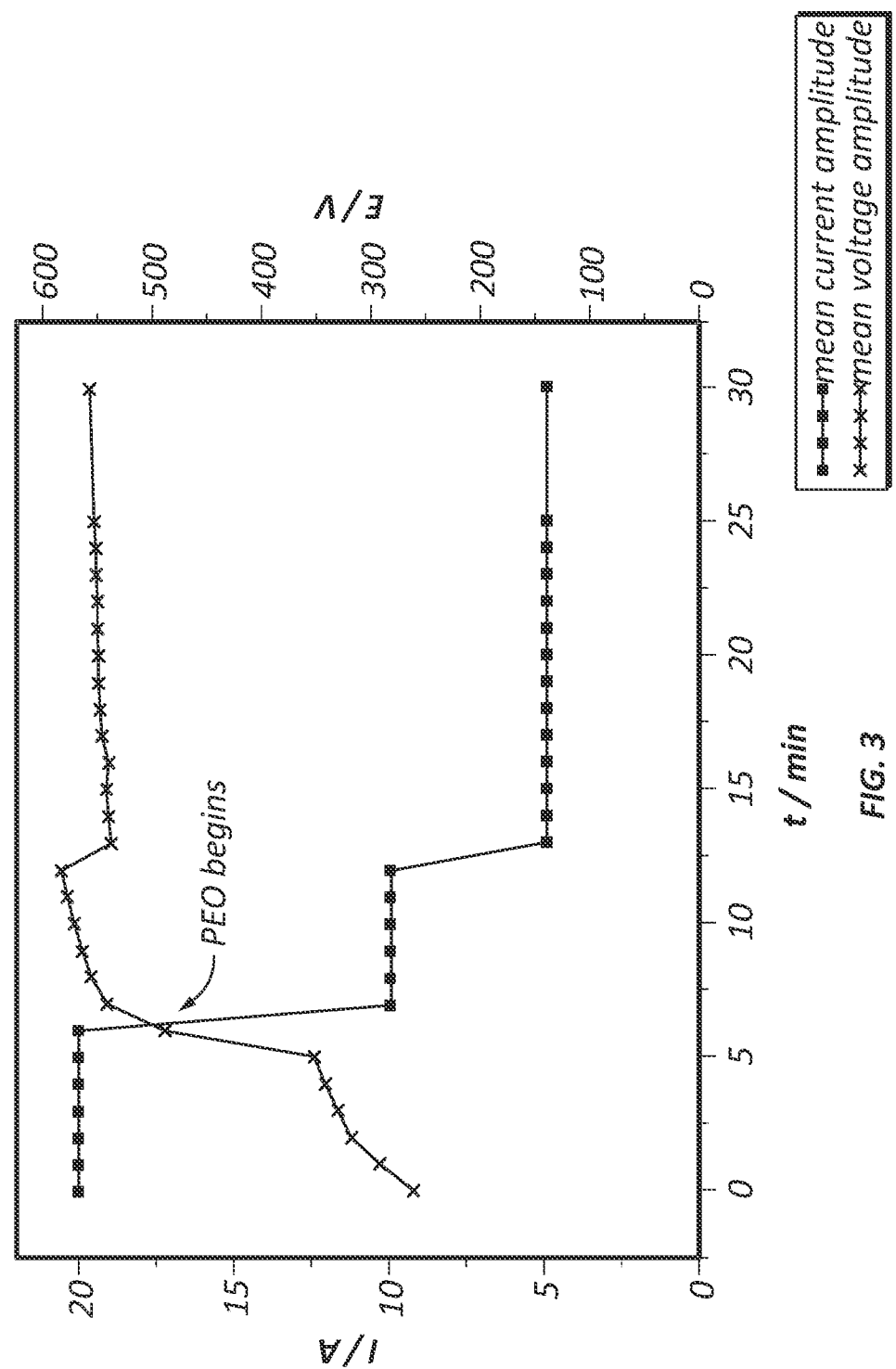
FIG. 3 is a graph showing variations of mean current and voltage amplitude values during a plasma electrolytic oxidation treatment of a metal substrate according to some embodiments of the present disclosure.

The embodiments set forth below represent the necessary information to enable those skilled in the art to practice the embodiments, and illustrate the best mode of practicing the embodiments. Upon reading the following description in light of the accompanying figures, those skilled in the art will understand the concepts of the disclosure and will recognize applications of these concepts that are not particularly addressed herein. It should be understood that these concepts and applications fall within the scope of the disclosure and the accompanying claims.

The purpose of terminology used here is only for describing embodiments and is not intended to limit the scope of the disclosure. Where context permits, words using the singular or plural form may also include the plural or singular form, respectively.

As used herein, the terms "integrated in," "integrated with," "embedded in," and variations thereof refer to structurally combining physical features with one another.

As used herein, the terms "concealed" or "hidden" refer to something that is not readily visible by an unaided human eye.

As used herein, the term "handheld mobile device" refers to a relatively small mobile computing device. Examples include a smartphone, tablet computer, wearable computer, or the like.

As used herein, the term "antenna element" refers to an electrically conductive element of an antenna that can radiate or receive electromagnetic radiation. For example, the conductive elements of a dipole antenna are antenna elements.

As used herein, the term "antenna break" refers to a gap or separation between antenna elements of an antenna. An antenna break is usually formed of non-conductive material that aids in insulating antenna elements from each other.

As used herein, the term "communications circuitry" refers to the various electronic circuitry of a handheld mobile device that controls the operations of an antenna to, for example, provide radio frequency (RF) electromagnetic radiation.

As used herein, unless specifically stated otherwise, terms such as "processing," "computing," "calculating," "determining," "displaying," "generating" or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

As used herein, the terms "connected," "coupled," or variants thereof, refer to any connection or coupling, either direct or indirect, between two or more elements. The coupling or connection between the elements can be physical, logical, or a combination thereof.

The disclosed embodiments relate to physical structures of handheld mobile devices having "hidden" antennas. An example of such a structure is a case that forms the housing of a smartphone. The smartphone case can embed antenna elements that are physically separated by an antenna break. The antenna break is formed of a non-conductive material that electrically separates the antenna elements from each other. The contiguous arrangement of antenna elements separated by an antenna break constitutes the antenna. The antenna break creates a discontinuity that is noticeable by an observer looking at the exterior of the smartphone case. A uniform appearance of the smartphone case that hides this discontinuity is desirable.

The disclosed embodiments include techniques for manufacturing a structure that has antenna elements separated by an antenna break, but which has a uniform appearance by an unaided observer of the structure. The appearance is uniform in that an observer cannot see the physical antenna breaks that typically separate antenna elements of a smartphone case. The antenna is hidden from an exterior view because an RF transparent ceramic layer covers the contiguous arrangement of antenna elements separated by an antenna break. In some embodiments, the structure of antenna elements separated by an antenna break is formed from an underlying metal injection molded (MIM) titanium substrate. The resulting product is durable and operable as an antenna of a handheld mobile device.

The antenna elements are formed of electrically conductive material such as a metal substrate that undergoes processes to form the hidden antenna structure. The conductive elements of the hidden antenna can be formed using different techniques. For example, the metal substrate can be formed from a casting process, a billet process, or an injection molding process. The metal substrate can then undergo processes to form the conductive antenna elements separated by an antenna break that collectively forms an antenna that is not readily visible by an unaided observer.

The metalworking process of MIM titanium can be used to improve the physical durability and uniform appearance of a structure including contiguous antenna elements separated by an antenna break as compared to other processes. For example, MIM titanium can be used instead of billet titanium to achieve a more durable structure including an embedded antenna with a more uniform appearance.

The disclosed embodiments include methods of manufacturing a structure including the conductive elements separated by non-conductive material that electrically separates the conductive elements from each other. The structure has a continuous and uniform non-conductive surface that at least partially hides the conductive elements and non-conductive gap between the conductive elements. The conductive elements can be electrically coupled to antenna circuitry of a handheld mobile device to enable the structure to operate as an antenna of the handheld mobile device.

For example, the structure can be a case forming a housing of a handheld mobile device that include an embedded antenna. In this embodiment, the conductive elements (e.g., antenna elements) are separated by a gap filled with a non-conductive material (e.g., antenna break) to collectively form an antenna. The antenna can be concealed by the continuous and uniform non-conductive exterior surface of the case. The exterior surface can be a layer of material that is transparent to RF electromagnetic radiation. As a result, an antenna is integrated in the case of the handheld mobile device while achieving a sleek uniform appearance.

According to the methods disclosed herein, a structure can be formed of multiple layers, including an exterior layer and an interior layer. An exterior layer may be composed of non-conductive material and form a continuous exterior surface of the structure. An interior layer may be composed of conductive material separated by non-conductive material, which is concealed by the external continuous layer of non-conductive material. The continuous exterior layer is transparent to electromagnetic radiation emitted or received by the interior layer.

FIGS. 1A-1F illustrate a process 100 for separating a conductive (e.g., metal) substrate into electrically insulated conductive elements according to some embodiments of the present disclosure. In FIG. 1A, the process 100 begins with a metal substrate 10. Examples of the conductive substrate include a cast metal substrate, a billet metal substrate, or a MIM substrate. As described further below, using a MIM titanium substrate can result in a more uniform appearance compared to using cast or billet metal substrates.

A cast metal substrate is created by forming a mold of the substrate. The mold can be formed in sand including a binding agent. This results in an impression in the sand of the same dimensions as the desired metal substrate. A molten metal is then poured into the mold and allowed to cool and harden. Once the molten metal solidifies, the mold is pulled apart and the desired metal substrate results.

A billet metal substrate is created by carving out the metal substrate from a solid metal block. The billet is the solid metal block from which the metal substrate is carved out. The size of the billet depends on the size of the desired metal substrate. In other words, the billet substrate must have a size and dimensions that are at least the same size and dimensions as the desired metal substrate. Thus, the billet metal substrate is created by removing excess material from the billet, essentially carving out the desired metal substrate from the solid block of metal.

The cast metalworking process is cost effective to manufacture at low quantities and can produce structures of various sizes that can be uniquely shaped. Disadvantages include being labor intensive, having a reduced dimensional accuracy compared to billet metalworking, having a rough surface finish, and resulting imperfections in the metal substrate.

Advantages of a billet metal substrate includes being cost effective to manufacture at low quantities, providing a high degree of precision, requiring relatively short lead times, and a resulting structure that is relatively stronger compared to a cast metal substrate. Disadvantages of a billet metal include relatively increased costs as quantities increase, certain designs are not cost effective to machine, and certain designs cannot be machined from a solid billet.

The case of a handheld mobile device such as a smartphone can have an embedded antenna formed from a cast or billet metal substrate. However, the resulting structure formed from a cast or a billet metal substrate tends to have noticeable physical imperfections that are undesired. Hence, the case forming the housing of a smartphone could appear with visible imperfections.

A MIM substrate, in particular a MIM titanium substrate, can be used to improve the durability and uniformity of a structure with a hidden antenna compared to using a cast or billet substrate. MIM is a metalworking process by which finely-powdered metal is mixed with a binder (e.g., resin) to make a feedstock. The feedstock can be processed by injection molding using plastic processing equipment. A molding process allows a dilated structure to be shaped in a single step and in high volume. After molding, the powder-binder mixture is subjected to steps that remove the binder and the metal powder is sintered. The end product is the desired metal substrate.

The MIM feedstock can be formed of a variety of metals including titanium and alloys such as stainless steel. The MIM substrate can undergo conditioning processes that result in a substrate that performs similarly to or better than those made through cast or billet processes. The MIM process has improved cost efficiency through high volume production because, for example, it reduces or eliminates additional operations such as machining of a billet to produce the metal substrate.

In FIG. 1B, the process 100 continues by subjecting the metal substrate 10 to a plasma electrolytic oxidation (PEO) process. The PEO process causes a ceramic layer 12 to be formed on one side of the metal substrate 10. In FIG. 1C, the ceramic layer 12 can optionally be reinforced with an epoxy layer 14. The remaining portion of the metal substrate 10 then undergoes an etching process in FIGS. 1D and 1E to form a gap 16 on the other side of the metal substrate 10.

Specifically, in FIG. 1D, the etching process may include an initial computer numerical control (CNC) mechanical machining process followed by an electrochemical machining (ECM) process, as shown in FIG. 1E. The CNC machining process may cause vibrations that could compromise the structural integrity of the ceramic layer 12. As such, the CNC machining process can be applied to initiate the etching process, which is completed with the ECM process. The CNC machining process or the ECM process can be used alone to etch the gap 16 in some instances.

The result of the etching process is two electrically insulated metal elements 10-1 and 10-2 supported by the ceramic layer 12, which can be reinforced by the epoxy layer 14. Lastly, in FIG. 1F, the gap 16 is filled with a non-conductive material 18, such as a plastic, adhesive, or any non-conductive material. In some embodiments, the non-conductive material 18 could be coated on the surface of the etched metal substrate 10. The electrically insulated metal elements 10-1 and 10-2 could be coupled to circuitry to form electrically insulated electronic components.

The disclosed techniques for manufacturing structures that include hidden components are not limited to that shown in FIGS. 1A-1F. Instead, any combination of suitable materials with suitable properties could be arranged in any number of layers.

A PEO process is an electrochemical technique used to form ceramic coatings on a variety of metals, such as aluminum, magnesium, and alloys, in addition to titanium. The PEO process can include immersing a surface of a bulk metal substrate in a solution containing a suitable electrolyte. The metal surface is subjected to a high potential difference (e.g., up to 600V) such that energetic discharge processes occur through a thin oxide layer between the solution and the immersed surface of the bulk metal substrate. The discharge processes (e.g., sparks) induce plasma, which modifies the chemical structure and porosity of the oxide layer, to generate thick and largely crystalline (i.e., ceramic) oxide layers for the metal substrate 10.

In some embodiments, the ECM process is a method by which a metal or alloy is selectively dissolved by electrolysis. For example, when applying an electric potential between a stainless steel cathode and a metal substrate (hereby acting as the anode), the product will dissolve in locations where the distance between the cathode and product is smallest, forming an inverse shape of the cathode in the metal substrate. A suitable electrolyte can be flushed between the cathode and the anode to conduct electric current and remove dissolved metal, as well as gas and heat generated during the ECM process.

FIGS. 2A and 2B are top views of a structure illustrating a process 200 for separating a metal substrate into electrically insulated metal elements according to some embodiments of the present disclosure. In FIG. 2A, the process 200 begins with a metal substrate 10, such as a Ti-6Al-4V (Grade 5) substrate. The metal substrate 10 is subjected to a PEO process inside a PEO cell to form an oxidized surface (e.g., ceramic layer 12). The ceramic layer 12 formed of the metal substrate 10 can have any desired shape and size. As shown, the ceramic layer 12 is octahedral-shaped and has a geometric area of 3.4 cm$^2$. The metal substrate 10 can be oxidized in a solution such as 8 g/L $Na_2SiO_3$ and 15 g/L $(NaPO_3)_6$ electrolyte at the flow rate of 3.4 L/min. The process 200 can be carried out using a DC square pulsed voltage (e.g., frequency at 1 kHz) and in a galvanostatic mode (i.e., at constant current density).

After the PEO treatment, the metal substrate 10 can be cut, as shown in FIG. 2B. This allows for obtaining the two electrically insulated metal substrates 10-1 and 10-2 connected by an electrically insulating ceramic layer 12. After cutting the metal substrate 10, the ceramic layer 12 can be coated with the epoxy layer 14 (not shown in FIG. 2A or 2B). For example, a thin layer of two different transparent epoxies, such as EPO2:EP14=100:60 and E-30CL, can be coated on the ceramic layer 12. The former epoxy can harden in air at room temperature, while the latter epoxy can be kept in the oven for 12 hours at 60° C., and then at room temperature for 12 hours to harden.

The epoxy layer 14 (not shown in FIG. 2A or 2B) can provide extra mechanical stability to support the weight of the metal substrate 10 during the etching process to produce the gap 16, which may not be possible with the ceramic layer 12 alone. Moreover, the epoxy layer 14 alone may not have the same strength of the epoxy layer 14 combined with the ceramic layer 12. After the hardening of the epoxy layer 14, the metal substrate 10 can be placed in an etching cell and subjected to, for example, a square wave pulsed voltage for the ECM process. For example, the electrolyte can include a solution of 425 g/L–1 $NaNO_3$. In some embodiments, an ECM process can apply 46.1 Volts with a pulse width of 1 millisecond, a 4 millisecond pause between pulses, and 54,000 repetitions.

FIG. 3 is a graph showing variations of mean current and voltage amplitude values over time during a PEO treatment of a metal substrate according to some embodiments of the present disclosure. The values shown in FIG. 3 are applied to form a ceramic layer on a Ti-6Al-4V (Grade 5) substrate. Hence, the PEO conditions could be adjusted in accordance with the values shown in FIG. 3 to obtain a desired ceramic layer for a Ti-6Al-4V (Grade 5) substrate. In contrast, an anodized Ti layer (not a ceramic layer) could result in a Ti Grade 5 substrate when applying conditions used to oxidize a Grade 1 or Grade 2 Ti substrate.

A relatively high current (e.g., i=20 A) value is applied at the beginning of the process (t=0) illustrated by FIG. 3. The relatively high current value leads to an increase of potential. The PEO process begins when the voltage exceeds a sparking potential of the metal substrate. The sparking potential corresponds to the voltage at which the discharge process begins (the inflection of the curve shown in FIG. 3). Then, the current can be progressively diminished without affecting the voltage much, which remains constant. As a result, this process could achieve the ceramic layer 12 of the metal substrate 10.

FIG. 4 is a table showing parameters involved in different processes for separating metal substrates into electrically insulated metal elements according to some embodiments of the present disclosure. Specifically, shown are parameter values for a PEO process, epoxy layer, and ECM process used to produce the respective structures (a) through (g). Each of (a) through (g) begins with a metal substrate having a surface area of 3.36 cm$^2$ that is exposed to a PEO treatment. The parameter variables "E," "i," and "t" refer to a potential (or voltage), current, and time, respectively. The variable "$t_{tot}$" refers to the total time duration of the PEO process.

The thickness of a ceramic layer on a metal substrate can vary by varying the PEO process. Hence, a ceramic layer can have a desired thickness while maintaining a continuous and uniform appearance. Specifically, the variable "a" represents the thickness of the ceramic layer for a respective structure. The thickness of a ceramic layer is defined as a thickness of the ceramic layer and the underlying metal substrate minus the thickness of the metal substrate before undergoing the PEO treatment (about 502 micrometers thick). The variable "a" is a conservative estimate of thickness because it does not take into account that the PEO process consumes the metal substrate to some extent. Thus, the ceramic layers that conceal the metal elements of (a) though (g) range from 33 to 156 micrometers while maintaining a continuous and uniform appearance.

After completing the PEO process, each structure (a) through (g) can be treated with combinations of two different epoxies to improve the mechanical resistance of each structure that undergoes an etching process. The variable "a+epoxy" represents the thickness of the ceramic layer "a" after the addition of an epoxy layer. As shown, the thickness of the ceramic layer combined with epoxy layer(s) that conceal the metal elements vary from 58.3 to 160.3 micrometers. As such, estimates of the thicknesses of the structures (a) through (g) before and after the application of the epoxies can be derived from the values shown in the table of FIG. 4.

The epoxy layer can provide added mechanical strength to support the subsequent etching process.

Lastly, the structures (a) through (g) can be subjected to an ECM process according to parameters outlined in the table of FIG. 4. In some embodiments, precipitation of hydroxide debris on a cathode during the ECM process should be avoided to prevent an incomplete etching of the metal substrate. The resulting structures can be intact and robust (e.g., without detectable differences between the performances of the two different epoxies).

The two metal elements of each resulting structure can be electrically separated from each other. As shown, the variable "contact" refers to whether there is any resulting electrical contact between the two metal elements of a respective structure after the ECM process was completed. Thus, the combination of the PEO processes and an etching process described above can be used to manufacture structures for a variety of applications, in addition to the those shown in FIGS. 1A through 2B.

However, the resulting structures are not limited by the number of layers shown in FIGS. 1A through 2B. Instead, the structures can include more or fewer layers. For example, a removable stabilizing layer, such as a plastic tape, could be used instead of a fixed epoxy layer. The plastic tape could provide mechanical strength when separating a metal substrate into distinct metal elements (separated by a gap), and then removed after the etching process is complete or after backfilling a gap with any suitable non-conductive material.

An example of a specific product that could be manufactured from the processes described above is a case forming a housing of a handheld mobile device that includes an embedded antenna. For example, the case may be formed of an exterior layer and an interior layer. The exterior layer could correspond to the ceramic layer 12 and/or the epoxy layer 14. The interior layer could include the metal elements 10-1 and 10-2 separated by the gap 16.

Figure 5:
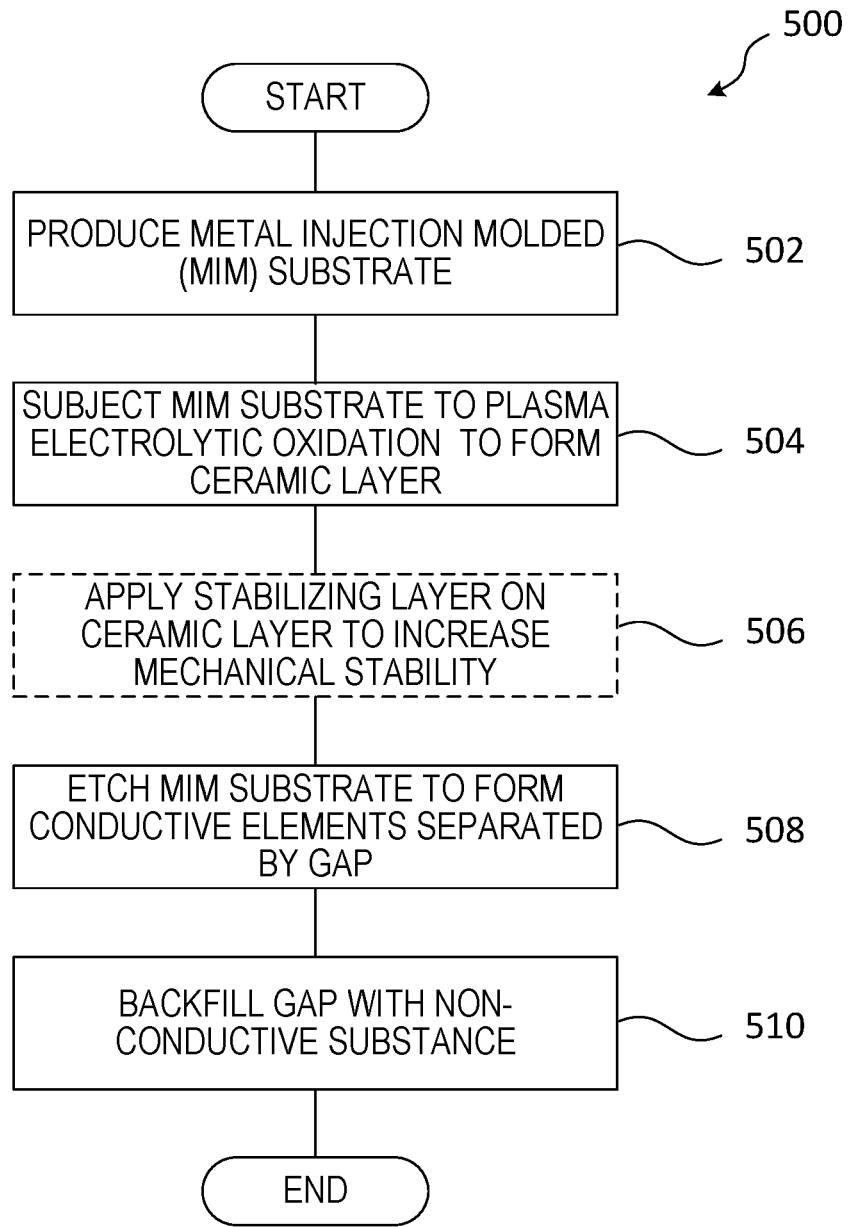
FIG. 5 illustrates a process for manufacturing a case forming a housing of a handheld mobile device that includes a hidden antenna according to some embodiments of the present disclosure.

The metal elements 10-1 and 10-2 can be electrically coupled to the communications circuitry of a handheld mobile device to form antenna elements separated by an antenna break. As such, the processes described above can be used to integrate antenna elements separated by an antenna break into a case of a handheld mobile device. The resulting antenna is at least partially hidden by the ceramic layer from an exterior view of the housing of the handheld mobile device FIG. 5 illustrates a process 500 for manufacturing a case structure forming a housing of a handheld mobile device that includes a hidden antenna according to some embodiments of the present disclosure.

In step 502, a MIM process is performed to create a MIM substrate. The MIM process involves combining metal powders with polymers such as wax and polypropylene binders to produce the feedstock mix that is injected as a liquid into a mold using plastic injection molding machines. The molded structure is cooled and ejected from the mold. Next, a portion of the binder material is removed using solvent, thermal furnaces, catalytic processes, or combinations thereof. The resulting substrate can be fragile and porous. To improve handling, the de-binding and sintering of the substrate can be combined into a single process. Sintering heats the powder to temperatures near the melting point to increase its density.

The end-product metal substrate has improved mechanical and physical properties compared to metal substrates made using other metalworking processes. There is a broad range of materials available when utilizing the MIM process. For example, the MIM substrate may have a uniform chemical composition of 90% titanium, 6% aluminum, and 4% vanadium with no impurities. The use of the MIM substrate is advantageous in forming a large volume of relatively small structures. Machining may be required for relatively closer dimensional tolerances. MIM is a relatively highly efficient option for fabricating structures formed of expensive metals (e.g., titanium) compared to other metalworking processes that involve significant material waste.

In step 504, the MIM substrate (e.g., metal substrate 10) is subjected to an electrochemical surface treatment process (e.g., PEO) to form a continuous and uniform non-conductive ceramic layer (e.g., ceramic layer 12). In some embodiments, the ceramic layer 12 has sufficient mechanical strength alone to enable the etching and backfilling processes of the remaining MIM substrate, to form antenna elements separated by one or more antenna breaks. For example, a ceramic layer could be 200 micrometers, which may support the etching and backfilling processes of a 300-micrometer thick underlying metal substrate.

In optional step 506, a stabilizing layer (e.g., epoxy layer 14) is applied on the ceramic layer to provide additional mechanical stability for the etching and backfilling processes of the MIM substrate. In some embodiments, the stabilizing layer may be a plastic tape that can be removed after etching and backfilling.

In step 508, the remaining MIM substrate undergoes one or more etching processes to form one or more gaps that separate the remaining MIM substrate into regions supported by the ceramic and stabilizing layers. The etching processes may include an initial CNC machining process followed by an ECM process. As indicated above, the vibrations caused by CNC machining could compromise the integrity of the ceramic layer and, as such, an ECM process can be used to complete the etching process to mitigate this risk. In some embodiments, an ECM process may be used as the sole etching process to form the gap(s).

In step 510, the gap(s) are backfilled with a non-conductive filler that acts as an electric insulator between the conductive metal regions. In some embodiments, the filler is a polymer and may include an adhesive that bonds the conductive metal regions and the ceramic coating. As a result, the combination of conductive metal regions separated by non-conductive filler, all supported by continuous non-conductive layers, can form a single case structure that integrates concealed antenna elements separated by antenna break(s).

The disclosed methods of integrating a concealed antenna with a case for a handheld mobile device are not limited to the examples shown in FIG. 5. A person skilled in the relevant technologies would understand that the steps of the disclosed methods could be practiced in different orders. In some embodiments, the methods may omit certain steps or include steps known to persons skilled in the art but not described herein for the sake of brevity. For example, in some embodiments, non-conductive coating technology could be utilized to conceal antenna features.

In some embodiments, a case embedding antenna elements separated by concealed antenna breaks is formed of multiple layers. For example, the case may include a continuous layer of non-conductive material that forms the external surface of the case. The case may also include a contiguous layer of conductive material separated by non-conductive material, which is hidden by the external continuous layer of non-conductive material. In this embodiment, the conductive material separated by non-conductive material forms the antenna elements separated by antenna breaks.

FIG. 6A shows an example of antenna elements separated by a antenna break forming a hidden antenna integrated in a case of a handheld mobile device. The back of a handheld mobile device 20 includes a case 22 with a continuous surface forming a housing of the handheld mobile device 20. The handheld mobile device 20 includes appurtenances such as a camera 24, a light source 26, and a physical button 28. These appurtenances may be incorporated in the continuous surface of the case 22. The case 22 includes antenna elements separated by antenna breaks that are hidden from the outside of the handheld mobile device 20. Thus, the case 22 appears uniform because it has a continuous exterior surface.

FIG. 6B is a functional representation of the antenna 30 formed by the case 22 of the handheld mobile device 20 of FIG. 6A. An outer layer of the case 22 is RF transparent to an inner layer that includes antenna elements 32-1 and 32-2 separated by an antenna break 34. As such, the case of the handheld mobile device 104 is an antenna having a continuous exterior surface.

Figure 6C:
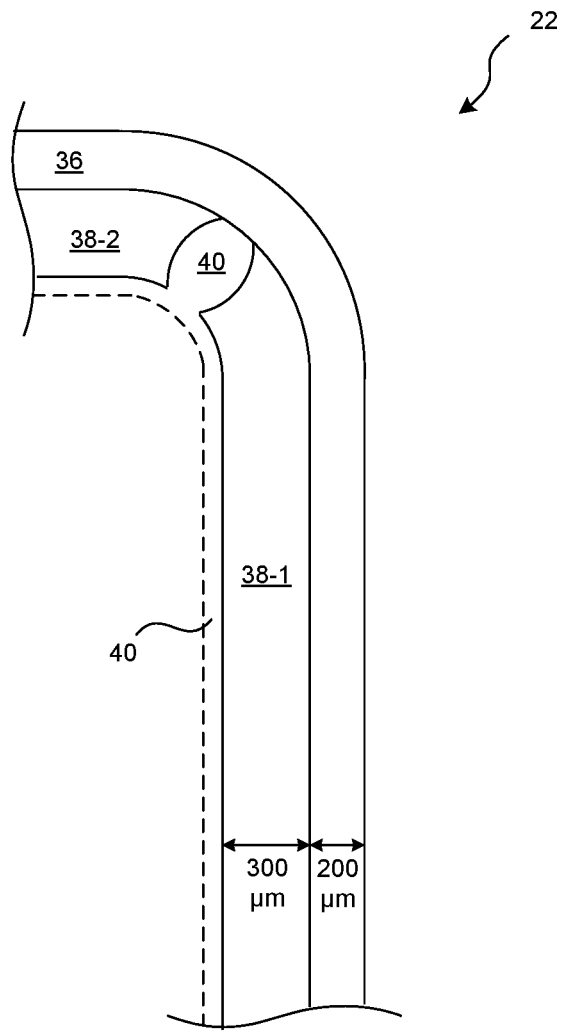
FIG. 6C is a cutaway profile view of a portion of the handheld mobile device of FIG. 6A according to some embodiments of the present disclosure.

FIG. 6C is a cutaway profile view of a portion of the case 22 of the handheld mobile device 20 of FIG. 6A. The case 22 is composed of multiple layers. An outermost continuous layer 36 of non-conductive material forms an exterior of the case 22. A contiguous layer of conductive material 38 separated by the non-conductive region 40 forms an interior layer of the case 22. Thus, the interior layer of the case 22 includes conductive regions 38-1 and 38-2 separated by the non-conductive region 40 corresponding to the antenna elements 32-1 and 32-2 separated by the antenna break 34, respectively, of FIG. 6B.

The outermost continuous layer 36 has sufficient thickness and hardness to provide structural support to form the case 22 and subsequently enable RF transparency for the antenna elements 38-1 and 38-2 of the inner contiguous layer. For example, the inner contiguous layer may be formed of the MIM substrate that is etched to create a gap (e.g., non-conductive region 40) that separates the MIM substrate into the conductive regions 38-1 and 38-2. The gap 40 could then be backfilled with non-conductive filler. In some embodiments, the non-conductive filler may include an adhesive that bonds the different regions of the contiguous layer to the outermost continuous layer to provide additional structural support for the case 22. In some embodiments, another non-conductive layer 40 could coat the surface of the inner contiguous layer to further electrically insulate the conductive regions 38-1 and 38-2 from each other.

The outermost continuous layer 36 may have sufficient thickness and hardness to remain structurally intact during the etching and backfilling processes, and then subsequently enabling RF transparency. In some embodiments, the outermost continuous layer 36 may have a thickness of about two-thirds the thickness of the contiguous layer. For example, FIG. 6C shows the outermost continuous layer 36 having a thickness of 200 micrometers and the inner contiguous layer having a thickness of 300 micrometers. The conductive regions 38-1 and 38-2 can be electrically coupled to communications circuitry of the handheld mobile device 20 to form the antenna elements 32-1 and 32-2 of the antenna 30. As such, the case integrates antenna elements separated by a antenna break hidden by the outermost continuous layer 36.

While the disclosure has been described in terms of several embodiments, those skilled in the art will recognize that the disclosure is not limited to the embodiments described herein, and can be practiced with modifications and alterations within the spirit and scope of the invention. Those skilled in the art will also recognize improvements to the embodiments of the present disclosure. All such improvements are considered within the scope of the concepts disclosed herein and the embodiments that follow. Thus, the description is to be regarded as illustrative instead of limiting.

The invention claimed is:

1. A housing of a handheld mobile device, the housing comprising:
   a ceramic layer forming a continuous outermost surface of the handheld mobile device; and
   an antenna layer underlying the ceramic layer, the antenna layer having a contiguous surface that spans the ceramic layer and includes:
      a plurality of conductive elements formed from a metal injection molded (MIM) substrate; and
      an antenna break of non-conductive material formed across a backside of the handheld mobile device to electrically separate the plurality of conductive elements and collectively form an antenna of the handheld mobile device that is hidden by the ceramic layer from an exterior view of the handheld mobile device.

2. The housing of claim 1, wherein the ceramic layer is a metal oxide layer formed from the MIM substrate.

3. The housing of claim 2, wherein the metal oxide layer is formed by plasma electrolytic oxidation of the MIM substrate.

4. The housing of claim 2, wherein the plurality of conductive elements are physically separated by a gap in the MIM substrate.

5. The housing of claim 4, wherein the gap is formed in the MIM substrate in part by an initial mechanical etching process.

6. The housing of claim 5, wherein the gap is formed to completion in the MIM substrate in part by an electrochemical process after the initial mechanical etching process has completed.

7. The housing of claim 5, wherein the mechanical etching process is a computer numerical control mechanical machining process.

8. The housing of claim 4, wherein the gap is the antenna break backfilled with a non-conductive material.

9. The housing of claim 8, wherein the non-conductive material is an adhesive that bonds the ceramic layer and the plurality of conductive elements.

10. The housing of claim 8, further comprising:
    an insulating layer that coats a surface of each conductive elements with a non-conductive material such that the plurality of conductive elements are electrically insulated from each other by the antenna break, the ceramic layer, and the insulating layer.

11. The housing of claim 1, wherein the MIM substrate comprises any of titanium, aluminum, magnesium, or a metal alloy.

12. The housing of claim 1, wherein the handheld mobile device is a smartphone and the antenna is embedded in a case forming the housing of the smartphone.

13. A smartphone device comprising:
    a case forming a housing of the smartphone device, the case including:
       a continuous outermost surface of the case; and
       a contiguous antenna structure that underlies and spans the continuous outermost surface of the smartphone device such that the antenna structure is hidden from an exterior view of the smartphone device by the continuous outermost surface of the smartphone device, the antenna structure including:
- a plurality of conductive elements formed of a metal injection molded (MIM) substrate; and
- an antenna break of non-conductive material formed across a backside of the smartphone device to separate the plurality of conductive elements and collectively form the antenna of the smartphone device.

14. The smartphone device of claim 13, wherein the continuous outermost surface is a surface of a metal oxide coating formed by plasma electrolytic oxidation of the MIM substrate.

15. The smartphone device of claim 13, wherein the plurality of conductive elements are electrically separated by a gap in the MIM substrate formed in part by an initial mechanical etching process and etched to completion by a subsequent electrochemical process.

16. The smartphone device of claim 15, wherein the mechanical etching is a computer numerical control mechanical machining.

17. The smartphone device of claim 15, wherein the gap is the antenna break backfilled with the non-conductive material.

18. The smartphone device of claim 17, wherein the non-conductive material is an adhesive that bonds the metal oxide coating and the plurality of conductive elements.

19. The smartphone device of claim 13, further comprising:
- an insulating layer that coats a surface of each conductive element with the non-conductive material such that the plurality of conductive elements are electrically insulated from each other by the antenna break, the metal oxide coating, and the insulating layer.

* * * * *